United States Patent
Smith

[15] 3,657,114
[45] Apr. 18, 1972

[54] ETHYLENE POLYMERS OF IMPROVED GLASS, TRANSPARENCY & HEAT-SEALABILITY CONTAINING A ZINC SALT OF A FATTY ACID

[72] Inventor: Vernon J. Smith, Lake Jackson, Tex.

[73] Assignee: The Dow Chemical Company, Midland, Mich.

[22] Filed: Sept. 25, 1970

[21] Appl. No.: 75,675

Related U.S. Application Data

[63] Continuation-in-part of Ser. No. 754,959, Aug. 23, 1968, abandoned.

[52] U.S. Cl................260/23 H, 260/85.7, 260/94.9 GD
[51] Int. Cl..........................C08f 29/02, C08f 45/00
[58] Field of Search.................................260/23 H

[56] References Cited

UNITED STATES PATENTS

| | | | |
|---|---|---|---|
| 2,462,331 | 2/1949 | Myers | 260/23 |
| 3,261,900 | 7/1966 | Spillers | 264/140 |
| 3,367,926 | 2/1968 | Voeks | 260/93.5 |

*Primary Examiner*—Donald E. Czaja
*Assistant Examiner*—H. S. Cockeram
*Attorney*—Griswold and Burdick, R. G. Waterman, L. J. Dankert and M. S. Jenkins

[57] ABSTRACT

Ethylene polymers having improved gloss and decreased haze which have incorporated therein from about 20 to about 400 parts per million of a zinc salt of a fatty acid having 7–22 carbon atoms. These polymers exhibit better printability after surface treatment than the same polymers without the fatty acid zinc salt and exhibit better heat sealability than do polymers containing more than the specified amounts of fatty acid zinc salt.

8 Claims, No Drawings

3,657,114

ETHYLENE POLYMERS OF IMPROVED GLASS, TRANSPARENCY & HEAT-SEALABILITY CONTAINING A ZINC SALT OF A FATTY ACID

This application is a continuation in part of our co-pending application Ser. No. 754,959, filed Aug. 23, 1968, now abandoned.

BACKGROUND OF THE INVENTION

Films of ethylene polymers are well known to be useful as bread wrapping, food bags, and in general packaging applications. It is desirable to improve the gloss of these films to increase their appearance to the consumer and at the same time improve or maintain the susceptibility of the films to be rendered printable by surface treatment, such as by electrostatic treatment with a corona arc.

It is known that metal salts of fatty acids can be added to ethylene polymers to improve the slip properties, to reduce blocking, for enhancing the processability, or for improving clarity. The amounts used in the prior art, e.g., U.S. Pat. Nos. 3,367,926, 2,462,331 and 3,261,900, were in excess of 500 parts per million (p.p.m. in order to achieve the desired results. Unfortunately films containing such quantities of the foregoing metal salts have poor heat-sealability.

SUMMARY OF THE INVENTION

In accordance with the present invention, ethylene polymers having improved surface gloss and haze and good heat-sealability are made by incorporating into the polymer a zinc salt of a fatty acid having 7 to 22 carbon atoms. More particularly, the present invention is directed to improved ethylene polymers having incorporated therein from about 20 to about 400 parts per million (p.p.m.) of a zinc salt of a monocarboxylic aliphatic saturated or unsaturated acid having a chain length of 7 to 22 carbon atoms. A preferred chain length range for the carboxylic acid is 16 to 20 carbon atoms.

The ethylene polymers having from about 50 to about 400 p.p.m. of the fatty acid zinc salt blended therein are preferred and a fatty acid zinc salt concentration of from about 100 to about 350 p.p.m. is most preferred.

Exemplary of the fatty acid zinc salts which can be used in the polymers of this invention are the zinc salts of heptylic, caprylic, capric, pelargonic, lauric, myristic, palmitic, stearic, arachidic, and behenic as well as their unsaturated analogs such as oleic, ricinoleic, etc. Of the foregoing zinc stearate is the preferred additive. Commercially available zinc stearate having normally occurring impurities is sufficient for the purposes of this invention.

The ethylene polymers used in this invention include polyethylene, blends of polyethylene, copolymers of ethylene and aliphatic, ethylenically unsaturated carboxylic esters, ethylene terpolymers comprised of ethylene, an ethylenically unsaturated carboxylic ester and an ethylenically unsaturated hydrocarbon, and mixtures thereof. Polyethylene and blends of polyethylene are the most advantageously affected by the practice of this invention. Illustrative of the aliphatic, ethylenically unsaturated carboxylic esters which may be copolymerized with ethylene are the acrylic and methacrylic esters and the vinyl esters of monobasic alkanoic acids. Specific examples of such esters are methyl acrylate, ethyl acrylate, n-propyl acrylate, isopropyl acrylate, n-butyl acrylate, isobutyl acrylate, n-hexyl acrylate, cyclohexyl acrylate, 2-ethyl-hexyl acrylate, methyl methacrylate, ethyl methacrylate, n-propyl methacrylate, vinyl propionate, vinyl n-butyrate, vinyl isobutyrate and the like. Ethylene polymers having a density within the range of about 0.910 to about 0.970 and a melt index in the range of about 0.01 to about 20.0 are preferred.

Examples of the unsaturated hydrocarbons which may be used to form the ethylene terpolymers include propylene, butene-1, pentene-1 and the like. Especially useful terpolymers are terpolymers containing about 0.5 per cent to about 20 per cent by weight of an ethylenically unsaturated monocarboxylic acid ester such as vinyl acetate, up to about 2 per cent of another copolymerizable ethylenically unsaturated hydrocarbon, especially propylene, the balance of the terpolymer composition, i.e., from about 80 per cent to about 99 per cent by weight, of ethylene, all percentages being based on the total copolymer weight. These terpolymers are described in patent U.S. Pat. No. 3,326,840 issued to H. E. Ross and W. H. Wharton.

While the compositions of the present invention consist substantially of ethylene polymers and zinc salts of fatty acids, small amounts of conventional additives and modifiers known to be useful in the plastic compounding art such as slip agents, anti-block agents, antioxidants, stabilizers, antistatic agents, pigments, waxes and the like, can be blended herein.

It is believed that the beneficial results obtained by this invention are attributed to the discovery of a concentration range of the metal salts of fatty acids which appears to have a surprising effect in that a more uniform degree of crystallinity is obtained. It is further believed that the improvement in gloss shown herein is not due to the presence of the metal salts on the surface of the film. This hypothesis is in sharp contrast to the known use of these materials in larger amounts to achieve decreased blocking and increased slip. It is further believed that the use of the larger amounts (i.e., about 1,000 p.p.m. or greater) results in an exudation of the metal salts to the surface of the film which accounts for the increased slip and decreased blocking and also impairs the printability. Also it has been found that concentrations of zinc fatty acid salts greater than 400 p.p.m. adversely affects the heat-sealability range of articles such as films fabricated from the ethylene polymers. For the purposes of this invention, heat-sealability of an article of ethylene polymer is defined as the ease which the article can be fused to itself or another identical or similar ethylene polymer to form a strong bond or seal. In order for an article of ethylene polymer to have good heat-sealability, it is necessary that the spread between the fusion temperature of the polymer and the temperature at which the heat sealing apparatus will pass through the article, so-called burn-through temperature, be as large as possible. If the burn-through temperature is reached or approached during heat sealing, the result is often an opening or cut in the article in the sealed area.

The ethylene polymers of this invention are prepared by co-melting the polymer and the zinc salt additive in a conventional mixer such as a Banbury mixer. Alternatively, the zinc salt can be dry blended with a particulate polymer and then extruded. The preferred method is to make a concentrated mixture of the polymer and the additive and then dilute this master-batch down to the desired concentration by adding additional polymer to it.

Films are formed from the present compositions by conventional equipment in which thin sheets of the polymer are extruded from a die onto chilled rollers and the film is collected on a take up roll.

The following examples are presented solely to illustrate this invention. No limitation on the scope of the invention is intended nor implied. All parts and percentages are by weight unless otherwise specified.

EXAMPLE 1

Polyethylene having a melt index of 1.0 (ASTM D-1238-65 T) and a density of 0.926 gms/cc (ASTM D-792-66) was used to make a master-batch of polyethylene and zinc stearate. Portions of this masterbatch were then extruded with more polyethylene to give the concentrations of zinc stearate set forth below in the Table I.

The control sample of polyethylene was reextruded also to assure that it had the same heat-ageing history as the test samples.

The blends were then extruded into a 1.25 mil film onto a chilled roll at a rate of 225 feet per minute and the film collected on a take up roll.

The clarity of these films was measured and found to be substantially unaffected.

The haze, in percent, of the film was measured by ASTM D-1003-1 and reported below.

The gloss, in percent, was measured by ASTM D-2457-65T and the films were all conditioned in accordance with ASTM D-618. A reading of 100+ indicates that the sample was glossier than the standard to which it was compared in the test.

TABLE I

| Run No. | p.p.m. Zn Stearate | Haze, Percent | Gardner Gloss, Percent | |
|---|---|---|---|---|
| | | | 20° Head | 45° Head |
| C₁* | 0 (Control) | 4.5 | 76 | 79 |
| 1 | 27 | 3.9 | 93 | 84 |
| 2 | 100 | 3.2 | 97 | 85 |
| 3 | 300 | 3.3 | 100+ | 86 |
| B₁* | 500 | 3.2 | 100+ | 84 |

*Not an example of the invention.

The table shows that small amounts of zinc stearate provide an increase in gloss and a decrease in haze. As indicated by Run No. B₁, larger amounts of this additive do not contribute any worthwhile gain, and adversely affect the heat sealability.

In a similar manner blends were extruded into 1.25 mil film onto a chilled roll at a rate of 100 feet per minute and were electrostatically treated in line with a Lepel Model HFSG-2 spark generator manufactured by Lepel Laboratories, Inc. The films are passed over a Mylar-covered metal grounded roll with a high tension treater bar positioned over the roll with about a 60 mil gap so that the film passes between the bar and the roll. A power input is established between the bar and the roll in the range of 100 to 15,000 watts. The passage of current causes a corona effect in the air space next to the film surface. This corona discharge treats the film so that the film surface will accept and bond to various inks.

The printability of the film was evaluated by spraying a single pass of "Poly-Treat Check Ink" (manufactured by the Independent Ink., Gardena, Calif.) on the film and allowing it to dry for 5 minutes. A strip of pressure sensitive tape was then pressed onto the ink surface and stripped away. The ink adhesion was then estimated by comparing the amount of ink remaining on the film with the amount that came off on the tape. The results in percent ink adhesion are recorded below.

TABLE II

| Power Input for Corona Treatment | p.p.m. Zn Stearate | | | | | |
|---|---|---|---|---|---|---|
| | 0 | 300 | 500 | 1000 | 1500 | 2000 |
| 5,100 watts | 50 | 90 | 95 | 90 | 75 | 70 |
| 7,600 watts | 50 | 80 | 90 | 90 | 70 | 70 |
| 10,000 watts | 50 | 60 | 90 | 80 | 60 | 70 |
| 12,600 watts | 70 | 60 | 50 | 70 | 50 | 60 |

In order to illustrate the adverse effects of heat ageing which might be encountered during extreme conditions of storage, portions of the same films were subjected to heat ageing at 140° F. for 66 hours prior to the ink application. The results in percent ink adhesion are recorded below.

TABLE III

| Power Input for Corona Treatment | p.p.m. Zn Stearate | | | | | |
|---|---|---|---|---|---|---|
| | 0 | 300 | 500 | 1000 | 1500 | 2000 |
| 5,100 watts | 40 | 40 | 30 | 5 | 5 | 0 |
| 7,600 watts | 60 | 70 | 60 | 20 | 10 | 5 |
| 10,000 watts | 90 | 80 | 90 | 40 | 30 | 20 |
| 12,600 watts | 70 | 90 | 80 | 40 | 30 | 20 |

Table II thus illustrates that the printability of the electrostatically treated film is considerably increased when a small amount of zinc stearate is added while at the same time the gloss is increased (Table I). It is also apparent from Table III that the additive, when used in the amounts claimed herein, does not substantially change the printability of heat-aged electrostatically treated film.

EXAMPLE 2

By repeating the procedures of Example 1 with a polyethylene having a melt index of 10.0 and a density of 0.934 similar results were obtained. It was noted that as the concentration of zinc stearate exceeded about 500 p.p.m. no further improvement in haze or gloss was obtained. Furthermore, when concentrations greater than about 500 p.p.m. are used the ink adhesion is adversely affected and this effect is more pronounced with heat ageing.

EXAMPLE 3

A blend of three polyethylenes was made by extruding together 50 parts by weight of a polyethylene having a density of 0.934 (melt index 10.0), 30 parts of a polyethylene having a density of 0.921 (melt index 1.2), and 20 parts of a polyethylene having a density of 0.934 (melt index 0.85). The blend was modified by the addition of 1,600 p.p.m. of finely divided silica and 800 p.p.m. of erucamide as slip and block agents and 150 p.p.m. of 2,6-di-tert-butyl-4-methylphenol as an antioxidant. Finally, a portion of the blend was modified by the addition of 250 p.p.m. of zinc stearate, the remainder of the blend being retained as a control. When this blend was cast into films and treated as in Example 1 it was found that the haze and gloss were considerably improved over the control having no zinc salt additive.

EXAMPLE 4

The procedures set forth in Example 1 are repeated using a copolymer of 80 percent by weight of ethylene and 20 percent by weight of ethyl acrylate. Similar improvement in gloss and printability of the electrostatically treated film are observed.

EXAMPLE 5

Example 1 is repeated with a terpolymer of 5 percent by weight of vinyl acetate, 1.5 percent of propylene and 93.5 percent of ethylene. Again the gloss and ability to be rendered printable are increased over the unmodified control.

EXAMPLE 6

Polyethylene having a melt index of 2 [ASTM D-1238-65 (E)] and a density of 0.921 gms/cc (ASTM D-792-66) was used to make a masterbatch of polyethylene and zinc stearate. Portions of this masterbatch were then extruded with more of the polyethylene to give blends having the concentrations of zinc stearate set forth below in Table IV.

A control sample ($C_2$) of the polyethylene was reextruded also to assure that it had the same heat-ageing history as the test samples.

The blends and the control sample were then extruded into 1.5 mil films onto a chilled roll at a rate of 125 feet per minute and the films were collected on take-up rolls.

The heat-sealability of the films of the blends and the control sample was determined by measuring the fusion temperature and the burn-through temperature for each film. The results are recorded in Table IV.

TABLE IV

| Run No. | p.p.m. Zn Stearate | Fusion Temperature | Heat-Seal Range, °F. Burn Through Temperature (1) |
|---|---|---|---|
| C₂* | 0 | 220 | 300 |
| 1 | 300 | 220 | 307 |
| 2 | 400 | 220 | 287 |
| 3* | 500 | 220 | 233 |
| 4* | 600 | 218 | 233 |

*Not an example of the invention.

(1) Average of three specimens.

As evidenced by the results of Table IV, the compositions of Example 6 have a heat-sealability range of 67° to 87° F. (Runs 1 and 2); or at least about 60° F, which is equivalent to the heat sealability range of the polyethylene containing no zinc stearate whereas compositions containing 500 p.p.m. or more of zinc stearate have a very poor heat sealability range.

Results similar to the foregoing may also be obtained when the zinc stearate is substituted by the analogous zinc fatty acid salts hereinbefore indicated.

I claim:

1. An ethylene polymer having improved surface gloss and decreased haze and having a heat-sealability range of at least about 60° F., said polymer having incorporated therein from about 20 parts per million to about 400 parts per million of a zinc salt of a fatty acid having from 7 to 22 carbon atoms.

2. A polymer as set forth in claim 1 wherein the zinc salt is incorporated in an amount from about 100 to about 350 parts per million.

3. A polymer as set forth in claim 1 wherein the fatty acid has a chain length in the range of 16 to 20 carbon atoms.

4. A polymer as set forth in claim 1 in which the polymer is polyethylene.

5. A polymer as set forth in claim 1 in which the polymer is a terpolymer of ethylene, propylene and vinyl acetate.

6. A polymer as set forth in claim 1 in which the polymer is a copolymer of ethylene and ethyl acrylate.

7. A polymer as set forth in claim 1 in which the zinc salt of a fatty acid is zinc stearate.

8. A polymer as set forth in claim 1 in which the zinc salt of a fatty acid is zinc stearate and in which the ethylene polymer is polyethylene.

* * * * *